United States Patent
Cioto et al.

(10) Patent No.: US 7,650,791 B2
(45) Date of Patent: Jan. 26, 2010

(54) SYSTEM AND METHOD FOR AUTOMATED EXECUTION OF BOLTED JOINTS

(75) Inventors: Rubens Cioto, Sorocaba (BR); Andre Renato Collares, Sorocaba (BR); Cesar Henrique Zuffo, Sorocaba (BR)

(73) Assignee: Metalac Sps Industria E Commercio Ltda, Cecilia, Sorocaba (BR)

( * ) Notice: Subject to any disclaimer, the term of this patent is extended or adjusted under 35 U.S.C. 154(b) by 0 days.

(21) Appl. No.: 11/572,644

(22) PCT Filed: Sep. 24, 2004

(86) PCT No.: PCT/BR2004/000185

§ 371 (c)(1),
(2), (4) Date: Jul. 24, 2008

(87) PCT Pub. No.: WO2005/123344

PCT Pub. Date: Dec. 29, 2005

(65) Prior Publication Data

US 2008/0314157 A1    Dec. 25, 2008

(30) Foreign Application Priority Data

Jun. 18, 2004    (BR) .................................. 0402362

(51) Int. Cl.
  *F16B 31/02* (2006.01)
(52) U.S. Cl. .......................................... 73/761; 73/760
(58) Field of Classification Search ............ 73/760–761
  See application file for complete search history.

(56) References Cited

U.S. PATENT DOCUMENTS

| | | | |
|---|---|---|---|
| 4,267,629 A | 5/1981 | Eshghy et al. | |
| 4,375,121 A | 3/1983 | Sigmund et al. | |
| 4,426,887 A * | 1/1984 | Reinholm et al. | 73/862.23 |
| 4,488,437 A * | 12/1984 | Pere | 73/761 |
| 4,813,312 A * | 3/1989 | Wilhelm | 81/467 |
| 5,284,217 A | 2/1994 | Eshghy et al. | |
| 5,366,026 A * | 11/1994 | Maruyama et al. | 173/180 |
| 5,903,462 A * | 5/1999 | Wagner et al. | 700/168 |
| 7,467,669 B2 * | 12/2008 | Friberg et al. | 173/1 |

FOREIGN PATENT DOCUMENTS

DE    4024577 A1    2/1992

* cited by examiner

*Primary Examiner*—Max Noori
(74) *Attorney, Agent, or Firm*—William J. Sapone; Coleman Sudol Sapone P.C.

(57) ABSTRACT

A tightening method yielding a precise control of the resulting clamping force, in which the tightening operation is performed in two steps, and the stress level is always kept within the limits of the elastic portion of the stress×strain curve. The method employs a single or multi-spindle power wrench controlled by a computer, provided with measuring means for the precise sensing of applied torque and turn angle in real time. The method comprises in a preferred embodiment a first and a second tightening operations, the data collected during the first operation being inputted to the computer which calculates the amount of torque to be applied to the fastener in the second and final tightening operation according to an algorithm which also comprises checking steps to ascertain that the results fall within the preset values, tolerances and scatter limits.

5 Claims, 4 Drawing Sheets

SYSTEM AND METHOD FOR AUTOMATED EXECUTION OF BOLTED JOINTS

FIELD OF THE INVENTION

The present invention relates to the joining of mechanical parts by means of bolts, studs, nuts and similar threaded elements and more particularly to a tightening method yielding a precise control of the resulting clamping force.

DESCRIPTION OF THE PRIOR ART

The increasing sophistication in production and manufacturing techniques mainly in the aerospace, automotive and nuclear industries has led to a dramatic increase in the requirements of safety and reliability, with the resultant increase of awareness of the importance of the study of bolted joints.

In some specific applications, such as in automotive power plants, the increase in power, efficiency as well as fuel economy are the outcome of a continuous quest for the reduction of components' size and weight, including such items as bolts, studs, etc. The fact that such reduction must not impair the safety and reliability of the joints has stimulated the development of more precise methods for designing bolted connections, in order to lessen the scatter and improve the accuracy of the results.

A bolted joint comprises the disengageable connection of two or more pieces by threaded fasteners that are held together by the clamping force $F_M$ which, in the case of a bolt, comprises the opposite compressive forces applied by the bolt's head and the nut. This force is created by means of the tightening process during which the bolt is stretched. The joint will remain stable as long as the clamping force provided by the bolt is greater than the external loads that tend to separate said pieces.

FIG. 1 depicts, in a highly schematic and idealized manner, a bolted joint in which pieces 11 and 12 are held together by bolt 13 and nut 14. Tightening the nut produces a compressive force $F_M$, which clamps together said pieces 11 and 12. This force is counteracted by the working load force $F_A$, which pushes outward against the clamping force. The joint will remain stable as long as the inequality $F_M > F_A$ holds.

As mentioned above, FIG. 1 depicts the joint in a highly idealized manner, which does not take into account the elasticity of the parts that make up the joint. In FIG. 2 a more realistic—albeit exaggerated—view of the deformations undergone by the bolt and the joined pieces is shown. The first is stretched by a small amount $\Delta L$ inversely related to its stiffness, which in turn depends on the material's Young modulus (modulus of elasticity) and the effective cross-section. As long as the bolt's material is working within the elastic region of the stress×strain curve, the clamping force will be related to the elongation by the equation $F_M = Kp \cdot \Delta Lp$, in which Kp is the stiffness of the bolt. This is a somewhat simplified view of the actual phenomena involved, as it does not take into account the deformations of the head and nut.

At the same time, the joined pieces 11 and 12 are compressed by the bolt's clamping force, its thickness being reduced from $L_1$ to $L_2$, at least in the vicinity of the bolt. This deformation, which is inversely proportional to the joint's stiffness, can be expressed by the relation $\Delta L_J = L_1 - L_2 = F_M/K_J$, where $K_J$ is the stiffness of the joint members. It should be noted that while there are equal forces acting upon both the bolt and the joint members, the bolt's deformation is substantially greater than the joint members' deformation. This is due to the fact that the stiffness $K_J$ of the joint is about 3 to 3 times greater than the bolt's stiffness Kp. This relation holds true when similar materials are used for the bolt and the joint; if the latter comprises dissimilar materials or members such as gaskets, elastic washers etc., the situation can be radically different, as cited by Bickford J. H. *An Introduction to the Design and Behavior of Bolted Joints,* 1981, pp. 104-105, who refers a case in which the gasket was compressed by 0.075" while the bolt stretch was only 0.011".

The various known bolting techniques have the main object of providing a previously specified clamping force $F_M$ that guarantees the stability of the joint. Precise measurement methods are available, such as the ultrasonic extensometer tests, however they are cumbersome and time consuming and not readily adaptable to mass production low cost manufacturing. Therefore the methods actually employed in most cases are based on the indirect control of the bolt preload i.e., the bolt's clamping force.

An elementary but widely employed technique is based on torque measurement, i.e., the turning or twisting moment applied to the bolt or nut. The magnitude of this moment is measured by devices generally known as torque wrenches. However, the use of torque wrenches results in unpredictable and non-uniform values of preload, partly due to the friction between the nut and the bolt's threads as well as in the contact between the joint members and the nut or the bolt's head. Lubrication may give a somewhat better result, but is not enough to produce reliable joints. Histogram of FIG. 3 (adapted from Bickford, op. cit, p. 74) in which the preload $F_M$ is plotted for a lot of 25 identical bolts when torqued to 530 N.m (400 lb-ft) shows a significant amount of scatter, ranging from de −18%, +42% of the mean value of preload, indicating the large uncertainty of the results based exclusively on torque control methods.

A more precise method of attaining a specified preload value is the so-called turn-of-nut procedure, which is based in the relation between bolt elongation and turning angle, either of the bolt's head or of the nut. The relation between the turn angle and the preload is given $\phi = (360/p) \cdot F_M (\delta_s + \delta_p)$ by the formula where $\phi$ is said angle in degrees, p is the thread's pitch and $\delta_s$ and $\delta_p$ are the joint's elasticity and the bolt's elasticity.

This method will give a precise control of the clamping force provided that the bolt is stretched well past the yield point. The bolts must be made of a ductile material having a long substantially flat plastic region as exemplified in the elastic curve of FIG. 4. As shown in this figure, in the plastic region E'-F' of the curve turning the bolt or the nut between angles E and F results in a very small variation in the preload $F_M$, in the order of ±5%. The two main drawbacks associated with this method are the need for a ductile material having a long, flat plastic region and the fact that the bolts are not re-usable due to cold work-hardening which reduces ductility.

OBJECTS OF THE INVENTION

In view of the preceding, it is the main object of the invention to provide a tightening method in which the threaded fastener works within the elastic region of the material.

Another object consists in providing a method, which produces a low scatter of the resulting fastener preload forces.

It is a further object of the invention to provide a tightening method, which is free from the variations in the coefficient of friction between the components of the joint.

Yet another object is to dispense with the need for high-ductility alloys.

An additional object is to allow the re-utilization of fasteners and bolts.

Lastly, the invention has the object of providing a tightening method, which can be advantageously applied to either single- or multi-spindle computer controlled power wrenches allowing real-time process control for each individual fastener.

BRIEF SUMMARY OF THE INVENTION

The preceding aims and objects are accomplished by the invention by providing a system consisting of a power wrench provided with real-time means that measure torque and turn angle values, said power wrench being bi-directionally coupled to a computer which comprises storage means for said values, as well as a resident program for computing the final values which will achieve the desired preload force and command means for the command of the power wrench to apply said torque or turn values to the fastener.

According to another aspect of the invention, the instantaneous values of the turn angle and torque measured in the course of the tightening operation are inputted to the resident program in order to determine the behavior of the elements comprising the individual joint and compute the final values of torque or turn angle that are to be applied by the power wrench in order to achieve the specified preload force.

According to another aspect of the invention, the tightening operation is based on an algorithm that in addition to computing the parameters of torque and turn angle comprises verification steps in which the conformity of the joint to preset standards is checked.

According to a further aspect of the invention, said algorithm comprises successive tightening steps, the torque and turn angle parameters collected during each step being inputted to the algorithm to compute the parameters to be used in the next step.

According to yet another aspect of the invention, the method comprises a first and a second tightening steps, the parameters collected during said first preliminary step being used as input for computing by means of the resident algorithm the parameters applied during the second final step.

According to another aspect of the invention, said algorithm comprises corroborative steps performed after said second final steps, the acceptance or rejection of the joint being contingent on the conformity to pre-established conditions.

BRIEF DESCRIPTION OF THE DRAWINGS

For a better understanding of the invention, its operating advantages and the specific results obtained by its use, reference should be made to the following detailed description of a preferred non-limiting embodiment taken in conjunction with the accompanying drawings in which.

DETAILED DESCRIPTION

Figure 1:
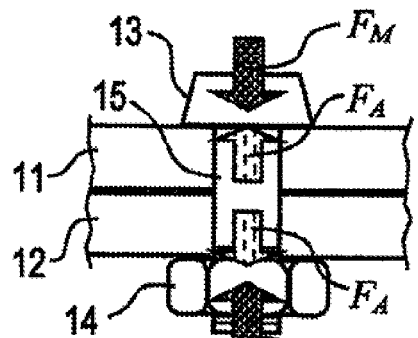
FIG. 1 shows a bolted joint in a highly schematic and idealized form.
Figure 2:
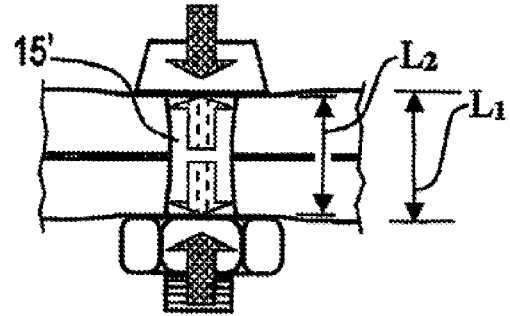
FIG. 2 shows an exaggerated view of a bolted joint emphasizing the deformations undergone by the bolt and the joined pieces.
Figure 3:
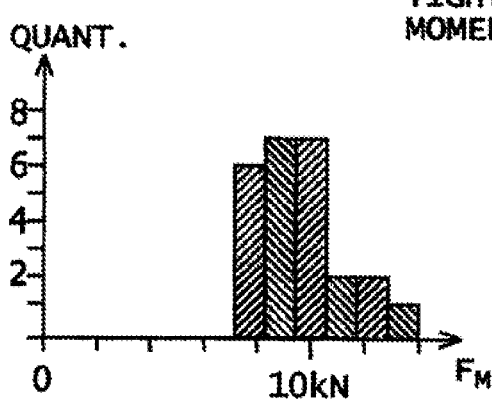
FIG. 3 is a histogram showing the preload scatter for a lot of 25 identical bolts when torqued to 530 N.m (400 lb-ft).
Figure 4:
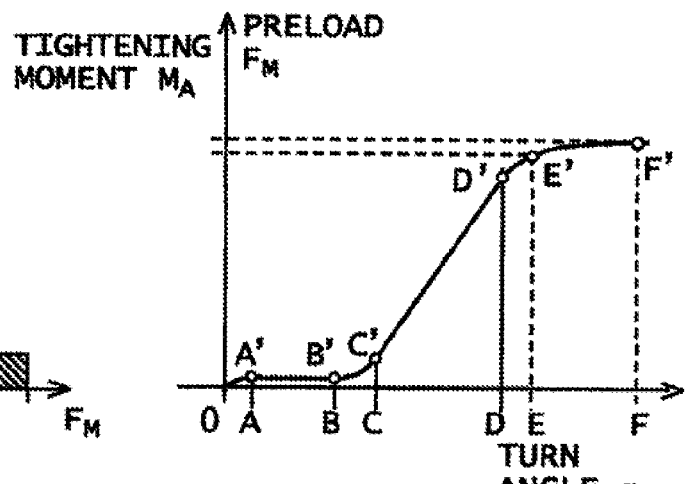
FIG. 4 depicts the general idealized behavior of a bolt being tightened, the curve comprising at first the running down phase (segment 0-A' B'), snugging (segment B'-C'), the linear portion (C' D') in which the bolt behaves elastically and the plastic portion (D'-E'-F').

Referring now to the drawings and particularly to FIG. 4, that depicts in a schematic form the curve that relates the torque and the turning angle of the bolt or nut, it can be seen that said torque remains negligible in the first portion A'-B' of the curve, corresponding to the running down of the nut, said portion having no bearing to the present method. From point B' on, the nut starts to pull the joint members together. Joint members may not be completely flat or there may be a bent washer, etc. As a result, most of the input is absorbed by the joint and the bolt sees only a small increase in preload: this process is called snugging, and the amount of turns required to reach point C' varies unpredictably.

After all joint members are in contact, all joint members start to to the present preferred embodiment, said preliminary torque value is a fraction, usually between 60% and 80% of the estimated final torque, said estimate being based in existing knowledge or in previous tests with the fastener being used.

Figure 5:
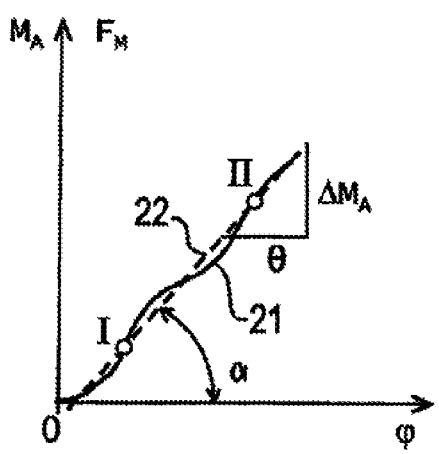
FIG. 5 shows the bolt behavior by means of the torque× angle curve during the first tightening phase in a real-life situation according to the present invention.

The data collected as the torque is increased from zero to said preliminary value yields the curve 21, which relates the turn angle to the inputted torque. As indicated in FIG. 5, this curve has an initial snugging portion, which will be disregarded. According to the proposed method, two points I and II are chosen in the linear portion, and the best theoretical straight line 22 passing through said points is mathematically determined using known methods, such as, for instance, linear regression. Said line 22 makes an angle α with the horizontal axis, the tangent of this angle being equal to the relation between the increments of the turning moment $\Delta M_A$ and the angular displacement θ. The next step consists of calculating the K factor by means of formula (1), below:

$$K = \frac{360 \cdot (\delta_s + \delta_p)}{p \cdot d} \cdot \frac{\Delta M_A}{\theta} = \frac{360 \cdot (\delta_s + \delta_p)}{p \cdot d} \cdot tg\alpha$$

where
 d is the nominal diameter of the bolt
 p is the pitch of the thread bolt's
 $\delta_s$ is the bolt's elasticity
 $\delta_p$ is the joint's a elasticity, and
 α is the angle between line 22 and the horizontal axis With the K factor, it is possible to calculate the final torque to reach the target clamp load (preload), by means of the expression (2) as follows:

$$M_{Ads} = F_M \cdot K \cdot d$$

where $F_m$ is the target preload, and
 $M_{Ads}$ is the final torque.

The above values are stored in the computer's memory to be used in posterior checking steps. Said torque should fall between previously defined limits, according to the relation (3), below:

$$M_{AMin} < M_{Ads} < M_{AMax}$$

The joints that do not meet this criterion are rejected.

Figure 6:
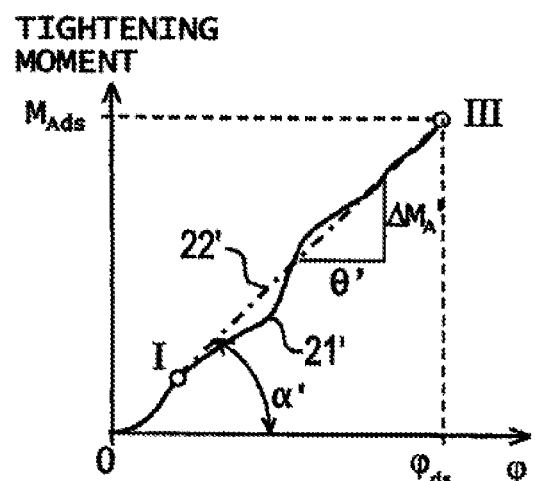
FIG. 6 depicts the bolt behavior in the final tightening phase according to the invention.
Figure 7A:
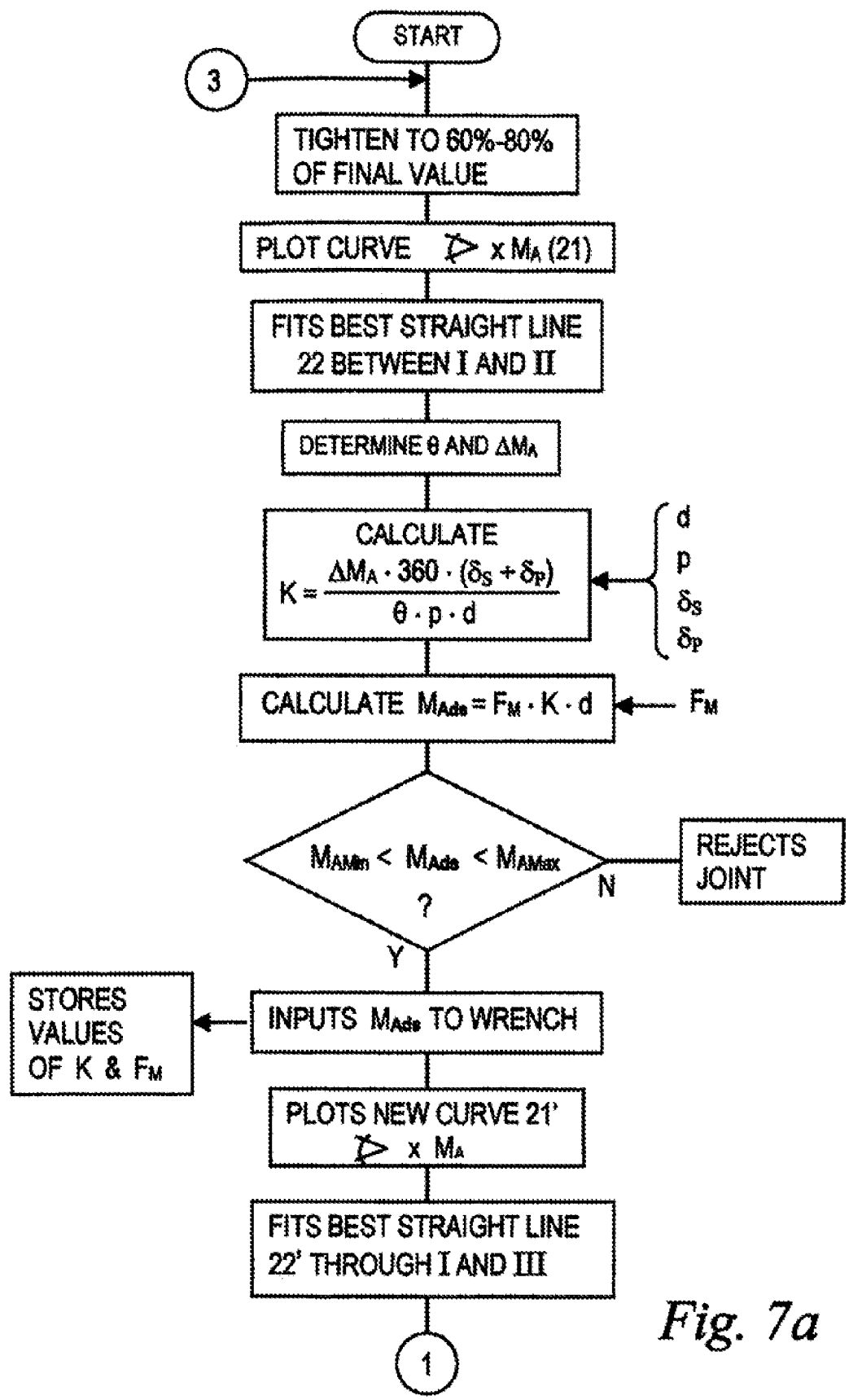
FIGS. 7-*a*, 7-*b* and 7-*c* detail by means of a flow graph the algorithm used in the present embodiment of the invention.
Figure 7B:
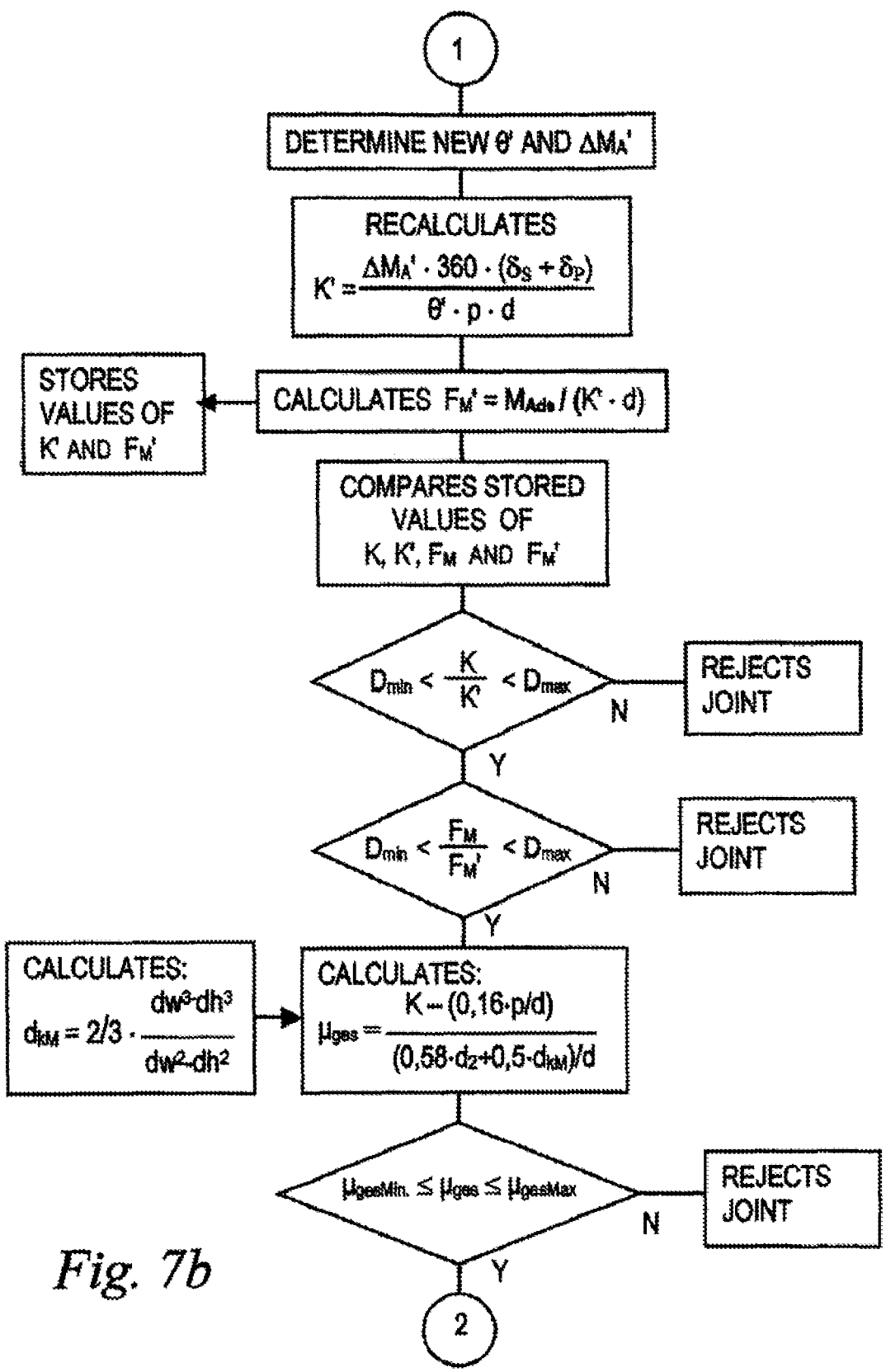
Figure 7C:
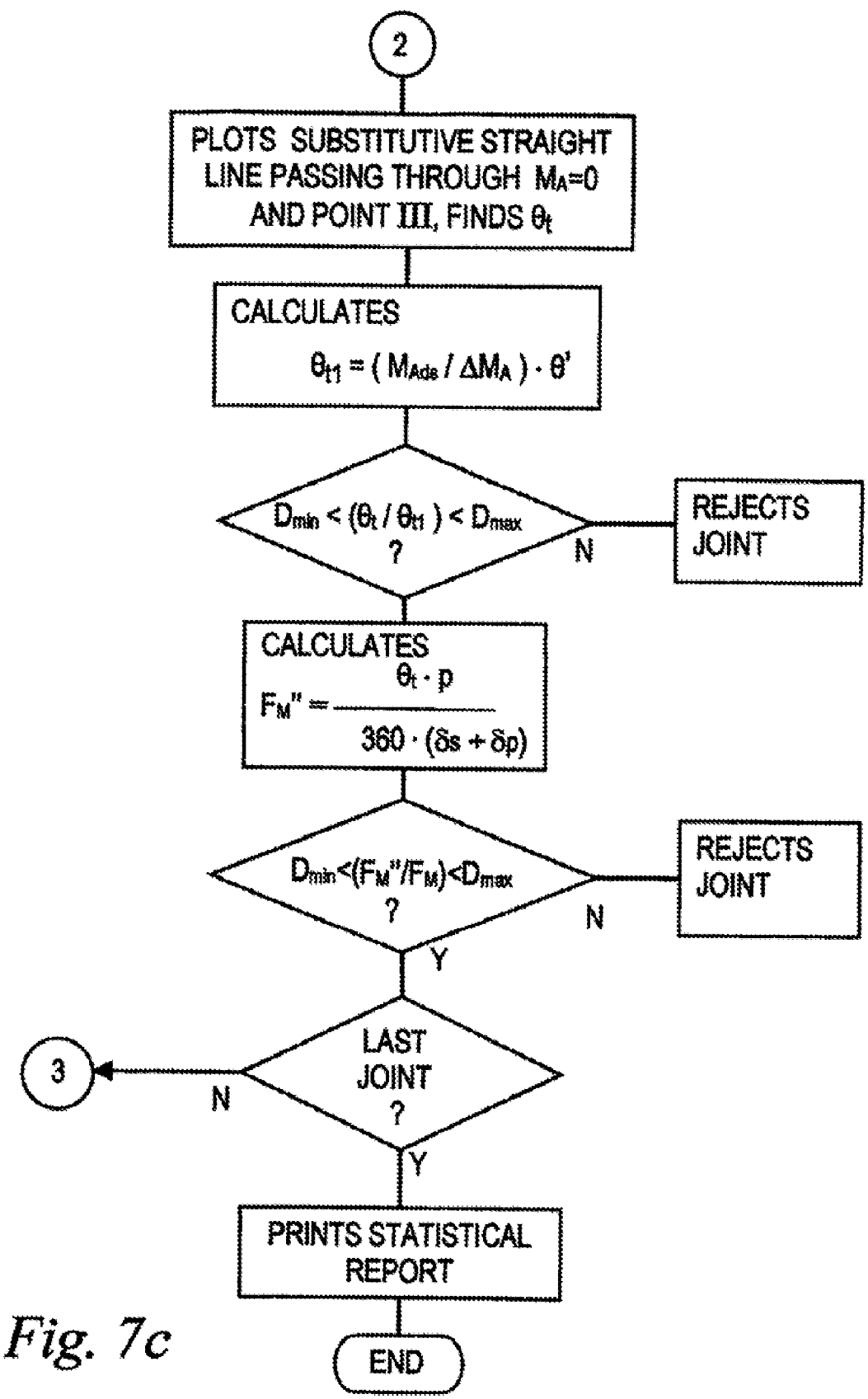

In the following final step, the power wrench applies said torque $M_{Ads}$ to the fastener, yielding the curve 21' shown in FIG. 6, which is a continuation of the previous curve 21. Point III, at the end of curve 21' will be used to calculate a new straight line 22', now adjusted to points I and III, which defines the new values of θ' and $\Delta M_A$' as well as the new angle α'. These new values, now related to the final tightening of the fastener, will be used to compute K' using formula (1) as well as the new clamping force $F_M' = M_{Ads}/(K' \cdot d)$, which are compared with the corresponding preliminary values. The allowable scatter, which lies between the limits designated as $D_{min}$ e$D_{max}$ is a function of the confidence level related to the specific application. In the present exemplary embodiment, said limits are equal to 0.97 and 1.03, meaning that the allowable scatter range will be ±3%. The joint will be accepted when the following relations are complied with:

$$0.97 < \frac{K}{K'} < 1.03 \ e \ 0.97 < \frac{F_M}{F_{M'}} < 1.03$$

Should said relations fall outside the allowable scatter range, the junction will be rejected and should be made over again with another fastener. Once more, it should be stressed that the above-mentioned limits are merely illustrative; different limits can be set in accordance with the intended application.

In addition to the above-mentioned checks, the algorithm comprises further tests, in order to eliminate joints with abnormalities such as excess friction, thread defects, etc. For the first test, the following friction value is computed:

$$\mu_{ges} = \frac{K - (0.16 \cdot p/d)}{(0.58 \cdot d_2 + 0.5 \cdot d_{kM})/d} \quad (4)$$

in which $$d_{kM} = 2/3 \cdot \frac{dw^3 - dh^3}{dw^2 - dh^2} \quad (5)$$

where $d_2$ is the diameter at the root of thread (primitive)

dw is the diameter of the effective nut's or bolt's head contact area, and dh is the hole diameter.

The joints which do not comply with the following relation will be rejected:

$$\mu_{gesMin} \leq \mu_{ges} \leq \mu_{gesMax}$$

where $\mu_{gesMin}$ and $\mu_{gesMax}$ are pre-established parameters.

The second additional check refers to the angle $\theta_t$ between a straight line passing through the origin ($M_A=0$) and the extreme of curve 21' corresponding to the final tightening moment $M_{Ads}$. The joint will pass the test if the relation below is complied with:

$$0.97 < (\theta_t/\theta_{t1}) < 1.03 \quad (7)$$

where $\theta_{t1} = (M_{Ads}/\Delta M_A) \cdot \theta'$

A further additional check uses a new value of the clamping force $F_M''$ computed by means of the formula shown below:

$$F_{M''} = \frac{\theta_t \cdot p}{360 \cdot (\delta s + \delta p)} \quad (9)$$

The value of this new clamping force is compared with the target value, and the joints which do not comply with the following relation will be rejected:

$$0.97 < (F_M''/F_M) < 1.03$$

The numerical values of $F_M$, $F_M'$, $F_M''$, K, K', $\mu_{ges}$ e $M_{Ads}$ for each joint are stored in the computer memory, allowing the compilation of a statistical report for quality control purposes.

The method of the invention is appropriable for computer controlled power wrenches having one or more spindles, and is particularly suitable for automated assembly lines due to the precision, reliability and repeatability of the results.

Notwithstanding the fact that the invention was described with reference to a particular embodiment, additional advantages of the present invention will readily occur to those skilled in the art, while keeping within the conceptual bounds of the invention. For instance, in junctions that comprise elastic parts such as gaskets more than two tightening steps may be employed, in which case the data collected in each step being used as an input for the subsequent tightening step. A different algorithm than the one employed in the detailed exemplary description may be used without overstepping the bounds of the inventive concept.

It should be also stressed that actual scatter limits of 0.97 and 1.03 are only exemplary, not being limitative in any way of the invention. In addition, some constant parameters in the formulae may differ from the ones employed in the embodiment shown without departing from the invention.

Furthermore, the final tightening may be performed by control of the final turn angle, as $\phi_{ds}$ and $M_{Ads}$ are mathematically related by the angle α'.

Consequently, the foregoing is considered as illustrative only of the principles of the invention. Further, since numerous modifications and changes will readily occur to those skilled in the art, it is not desired to limit the invention to the exact instruction and operation shown and described. All suitable modifications and equivalents that fall within the scope of the appended claims are deemed within the present inventive concept.

We claim:

1. A method for automated execution of bolted joints using a power wrench provided with real-time sensing means that continuously measure torque and turn angle values, a computer connected by communication means to said power wrench, said computer being provided with memory means wherein said method comprises sequential tightening steps which apply increasing stress forces to said fasteners without exceeding the elastic limits of the fastener material, the data relating to torque and turn angle collected in a given step being used to compute the torque or turn angle applied by said power wrench in the following step:

providing an algorithm, which comprises of a sequence of computing operations and a sequence of checking operations, said algorithm performing the following steps:

initial tightening to a pre-established torque which is a fraction of the final torque value, storing continuously the data collected by sensing means provided in the wrench to generate a curve relating torque and turn angle;

determination of the best fitting straight line passing through two predefined points in the straight portion of said curve;

determination of the slope of said straight line which relates the values of turning moment $\Delta M_A$ and the angular displacement θ;

computation of the K factor using the formula (1) below:

$$K = \frac{360 \cdot (\delta_s + \delta_p)}{p \cdot d} \cdot \frac{\Delta M_A}{\theta} \quad (1)$$

computation of the torque to be applied in the final tightening step using the target value of the clamping force (preload) according to formula (2):

$$M_{Ads} = F_M' d^{-1} K \quad (2)$$

checking whether the relation $M_{Amin} < M_{Ads} < M_{AMax}$ holds true, where $M_{Amin}$ e $M_{AMax}$ are previously defined, rejecting the junctions that do not fit this criterion;
applying torque $M_{Ads}$ to the fastener;
plotting a new substitutive straight line and corresponding angular coefficients $\Delta M_A$'e $\theta$';
using formula (1) recalculation of valor de K' using the new angular coefficients;
checking whether the relation $D_{min} < (K/K') < D_{max}$ holds true,
rejecting the junctions that do not fit this criterion;
recalculation of the clamping force variation according to the expression $F_M' = M_{Ads}/(K' \cdot d)$;
checking whether the relation $Dmin < (F_M/F_M) < D_{max}$ holds true, rejecting the junctions that do not fit this criterion;
computing the friction coefficient $\mu_{ges}$ by means of the formula $$\mu_{ges} = \frac{K - (0{,}16 \cdot p/d)}{(0.58 \cdot d_2 + 0.5 \cdot d_{kM})/d}$$

where $$d_{kM} = C_4 \cdot \frac{dw^3 - dh^3}{dw^2 - dh^2}$$

checking whether the relation $\mu_{gesMin} \leq \mu_{ges} \leq \mu_{gesMax}$ holds true rejecting the junctions that do not fit this criterion;
determining the angle $\theta_t$ between the horizontal axis and a straight line passing through the points of the curve corresponding to $M_{Ads}$ and $M_A = 0$
calculating the value $\theta_{t1} = (M_{Ads}/\Delta M_A) \cdot \theta'$
checking the whether the relation $D_{min} < (\theta_t/\theta_{t1}) < D_{max}$ holds true, rejecting the junctions that do not fit this criterion;
computing $$F_{M''} = \frac{\theta_t \cdot p}{360 \cdot (\delta s + \delta p)}$$

checking whether the relation $D_{min} < (F_{M''}/F_M) < D_{max}$ holds true, rejecting the junctions that do not fit this criterion.

2. A method as claimed in claim 1, wherein said algorithm comprises a first preliminary tightening step and a second final step, the torque and turn angle data relating to said first tightening step being used to compute the value of torque applied by the wrench to the fastener in said second final step.

3. A method as claimed in claim 2, wherein said first step comprises tightening the fastener to a preload which is a fraction of the estimated final value of preload.

4. A method as claimed in claim 3 wherein said fraction is between 60% and 80%.

5. A method as claimed in claim 1, wherein the data related to the tightening process of each bolt are stored and a statistical report based on said data is printed at the end of the operation.

* * * * *